(12) United States Patent
Wang et al.

(10) Patent No.: US 11,796,858 B2
(45) Date of Patent: Oct. 24, 2023

(54) BACKLIGHT SUBSTRATE, MANUFACTURING METHOD THEREOF AND DISPLAY DEVICE

(71) Applicant: BOE Technology Group Co., Ltd., Beijing (CN)

(72) Inventors: Pengpeng Wang, Beijing (CN); Haisheng Wang, Beijing (CN); Xiaoliang Ding, Beijing (CN); Yangbing Li, Beijing (CN); Yapeng Li, Beijing (CN); Ping Zhang, Beijing (CN); Likai Deng, Beijing (CN); Yubo Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 659 days.

(21) Appl. No.: 16/966,581

(22) PCT Filed: Aug. 5, 2019

(86) PCT No.: PCT/CN2019/099238
§ 371 (c)(1),
(2) Date: Jul. 31, 2020

(87) PCT Pub. No.: WO2021/022438
PCT Pub. Date: Feb. 11, 2021

(65) Prior Publication Data
US 2023/0093943 A1    Mar. 30, 2023

(51) Int. Cl.
*G02F 1/13357* (2006.01)
*G01S 17/08* (2006.01)
*G01S 17/89* (2020.01)

(52) U.S. Cl.
CPC ........ *G02F 1/133603* (2013.01); *G01S 17/08* (2013.01); *G01S 17/89* (2013.01); *G02F 1/133606* (2013.01); *G02F 1/133621* (2013.01)

(58) Field of Classification Search
CPC ........ G02F 1/133603; G02F 1/133606; G01S 17/08; G01S 17/88–894
See application file for complete search history.

(56) References Cited

U.S. PATENT DOCUMENTS

2018/0113593 A1    4/2018   Ng et al.
2021/0216163 A1*   7/2021   Wang ................... G06F 3/0421

FOREIGN PATENT DOCUMENTS

CN    102043272 A    5/2011
CN    104881166 A    9/2015
(Continued)

OTHER PUBLICATIONS

Office Action dated May 7, 2021 issued in corresponding Chinese Application No. 201980001244.2.

*Primary Examiner* — Mariceli Santiago
(74) *Attorney, Agent, or Firm* — Nath, Goldberg & Meyer; Joshua B. Goldberg

(57) ABSTRACT

The present disclosure provides a backlight substrate, a manufacturing method thereof, and a display device. The backlight substrate includes: a base substrate; a plurality of first light emitting elements on the base substrate and configured to emit first light; a plurality of second light emitting elements on the base substrate and configured to emit second light having a different wavelength from the first light; a plurality of depth sensors on the base substrate and configured to receive the second light emitted from the plurality of second light emitting elements and reflected by an object and determine depth information of the object based on the received second light; and a diffusion layer in (Continued)

direct contact with light emitting surfaces of the plurality of first light emitting elements and configured to diffuse the first light emitted from the plurality of first light emitting elements.

18 Claims, 4 Drawing Sheets

(56) References Cited

FOREIGN PATENT DOCUMENTS

| CN | 105303549 A | 2/2016 |
|---|---|---|
| CN | 207082529 U | 3/2018 |
| CN | 109581747 A | 4/2019 |
| CN | 110062932 A | 7/2019 |

\* cited by examiner

BACKLIGHT SUBSTRATE, MANUFACTURING METHOD THEREOF AND DISPLAY DEVICE

CROSS-REFERENCE TO RELATED APPLICATION

This is a National Phase Application filed under 35 U.S.C. 371 as a national stage of PCT/CN2019/099238, filed on Aug. 5, 2019, the contents of which are incorporated herein in their entirety by reference.

TECHNICAL FIELD

The present disclosure relates to the field of display technology, and particularly relates to a backlight substrate and a display device including the same.

BACKGROUND

With the development of 3D technology, the application of technologies such as stereoscopic display, machine vision, satellite remote sensing, etc. increasingly requires acquisition of depth information of a scene. Typically, depth sensors are relied upon to detect depth information of the environment. Integrating depth sensors with a display panel has become a research hotspot in the display field.

Currently, the mainstream 3D depth sensors are mainly based on the following three technologies: structured light, TOF (time of flight), binocular imaging (stereo system). The depth calculation based on the TOF is not influenced by the gray level and the characteristics of the surface of an object, and the three-dimensional detection can be performed rapidly and accurately in real time.

SUMMARY

In one aspect, the present disclosure provides a backlight substrate, including: a base substrate; a plurality of first light emitting elements on the base substrate and configured to emit first light; a plurality of second light emitting elements on the base substrate and configured to emit second light having a different wavelength from the first light; a plurality of depth sensors on the base substrate and configured to receive the second light emitted from the plurality of second light emitting elements and reflected by an object and determine depth information of the object based on the received second light; and a diffusion layer in direct contact with light emitting surfaces of the plurality of first light emitting elements and configured to diffuse the first light emitted from the plurality of first light emitting elements.

In some embodiments, the backlight substrate further includes: a shielding structure, and an optical filter and a lens which are sequentially on a light receiving side of the depth sensor. The depth sensor, the optical filter and the lens are in a space defined by the shielding structure.

In some embodiments, a distance between a surface of the diffusion layer away from the base substrate and the base substrate is greater than a distance between a light emitting surface of the first light emitting element and the base substrate, and is smaller than a height of the shielding structure relative to the base substrate.

In some embodiments, the diffusion layer includes a sealant doped with an organic light diffuser.

In some embodiments, the plurality of first light emitting elements, the plurality of second light emitting elements, and the plurality of depth sensors are on a same side of the base substrate, and the diffusion layer is on a side of the plurality of first light emitting elements, the plurality of second light emitting elements, and the plurality of depth sensors away from the base substrate.

In some embodiments, the backlight substrate further includes a polyethylene terephthalate (PET) layer on a side of the diffusion layer away from the base substrate.

In some embodiments, the plurality of second light emitting elements are configured to emit modulated infrared light as the second light, the plurality of first light emitting elements are configured to emit visible light as the first light, and the plurality of depth sensors includes infrared sensitive depth sensors.

In some embodiments, the plurality of first light emitting elements are arranged in an array on the base substrate, and the plurality of second light emitting elements are arranged at gaps between the plurality of first light emitting elements.

In some embodiments, the plurality of depth sensors are arranged along an edge of the base substrate.

In another aspect, the present disclosure also provides a display device including a display panel and the backlight substrate according to the present disclosure. The display panel is on a light emitting surface of the backlight substrate and configured to display an image using the first light emitted from the plurality of first light emitting elements of the backlight substrate.

In some embodiments, the display panel is a liquid crystal display panel, and the display device further includes a control circuit configured to control deflection of liquid crystals in the liquid crystal display panel based on measured display uniformity of the liquid crystal display panel such that display brightness of the liquid crystal display panel is uniform.

In some embodiments, the display device further includes an adjustment circuit configured to adjust a number of display gray scales of the liquid crystal display panel by adjusting brightness of the first light emitted from the first light emitting elements while the liquid crystal display panel displays an image.

In another aspect, the present disclosure also provides a method of manufacturing a backlight substrate, including: providing a base substrate; forming a plurality of first light emitting elements, a plurality of second light emitting elements, and a plurality of depth sensors on the base substrate, wherein the plurality of first light emitting elements are formed to emit first light; the plurality of second light emitting elements are formed to emit second light having a different wavelength from the first light; the plurality of depth sensors are formed to receive the second light emitted from the plurality of second light emitting elements and reflected by an object, and determine depth information of the object based on the received second light; and forming a diffusion layer in direct contact with light emitting surfaces of the plurality of first light emitting elements, the diffusion layer configured to diffuse the first light emitted from the plurality of first light emitting elements.

In some embodiments, the method further includes: forming a shielding structure and an optical filter and a lens which are sequentially on a light receiving side of the depth sensor. The depth sensor, the optical filter and the lens are in a space defined by the shielding structure.

In some embodiments, a distance between a surface of the diffusion layer away from the base substrate and the base substrate is greater than a distance between a light emitting surface of the first light emitting element and the base substrate, and is smaller than a height of the shielding structure relative to the base substrate.

In some embodiments, the diffusion layer includes a sealant doped with an organic light diffuser.

In some embodiments, the plurality of first light emitting elements, the plurality of second light emitting elements, and the plurality of depth sensors are formed on a same side of the base substrate, and the diffusion layer is formed on a side of the plurality of first light emitting elements, the plurality of second light emitting elements, and the plurality of depth sensors away from the base substrate.

In some embodiments, the method further includes forming a polyethylene terephthalate (PET) layer on a side of the diffusion layer away from the base substrate.

In some embodiments, the plurality of second light emitting elements are formed to emit modulated infrared light as the second light, the plurality of first light emitting elements are formed to emit visible light as the first light, and the plurality of depth sensors include infrared sensitive depth sensors.

In some embodiments, the plurality of first light emitting elements, the plurality of second light emitting elements, and the plurality of depth sensors are formed on the base substrate using micro-transfer technique.

BRIEF DESCRIPTION OF THE DRAWINGS

The following drawings are merely examples for illustrative purposes in accordance with various embodiments of the present disclosure and are not intended to limit the scope of the present disclosure.

DETAILED DESCRIPTION

The embodiments of the present disclosure will be described in detail below with reference to the accompanying drawings. It should be understood that specific embodiments are described herein by way of illustration and explanation only, and are not intended to limit the present disclosure.

In a conventional direct type backlight substrate, a series of films (e.g., a diffusion sheet, a quantum dot film, a prism film, etc.) are generally included to make light emitted from light emitting elements of the backlight substrate more uniform. Although the depth sensor may be disposed in the gap between the light emitting elements of the backlight substrate, these films may deteriorate the imaging quality of the depth sensor. Accordingly, the present disclosure provides, inter alia, a backlight substrate, a method of manufacturing the backlight substrate, and a display device including the backlight substrate that substantially obviate one or more of the problems due to limitations and disadvantages of the related art. In an aspect, the present disclosure provides a backlight substrate, including: a base substrate; a plurality of first light emitting elements on the base substrate and configured to emit first light; a plurality of second light emitting elements on the base substrate and configured to emit second light having a different wavelength from the first light; a plurality of depth sensors on the base substrate and configured to receive the second light emitted from the plurality of second light emitting elements and reflected by an object and determine depth information of the object based on the received second light; and a diffusion layer in direct contact with light emitting surfaces of the plurality of first light emitting elements and configured to diffuse the first light emitted from the plurality of first light emitting elements.

Figure 1:
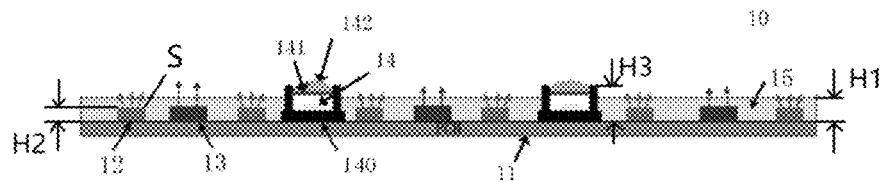
FIG. 1 is a schematic diagram illustrating a structure of a backlight substrate according to some embodiments of the present disclosure.

FIG. 1 is a schematic diagram illustrating a structure of a backlight substrate according to some embodiments of the present disclosure. Referring to FIG. 1, in some embodiments, a backlight substrate 10 includes a base substrate 11, and a plurality of first light emitting elements 12, a plurality of second light emitting elements 13, and a plurality of depth sensors 14 on the base substrate 11. The plurality of first light emitting elements 12 are configured to emit first light. The plurality of second light emitting elements 13 are configured to emit second light having a different wavelength from the first light. The plurality of depth sensors 14 are configured to receive the second light emitted from the plurality of second light emitting elements 13 and reflected by the object, and determine depth information of the object based on the received second light. As shown in FIG. 1, the plurality of first light emitting elements 12, the plurality of second light emitting elements 13, and the plurality of depth sensors 14 are located on a same side of the base substrate 11. In some embodiments, the backlight substrate 10 further includes a diffusion adhesive layer 15 located at a side of the plurality of first light emitting elements 12, the plurality of second light emitting elements 13 and the plurality of depth sensors 14 away from the base substrate 11. The diffusion adhesive layer 15 is configured to diffuse the first light emitted from the plurality of first light emitting elements 12.

The backlight substrate according to the embodiments of the present disclosure may be applied to a liquid crystal display device. A liquid crystal display panel may be arranged on a light emitting side of the backlight substrate. The first light emitted from the plurality of first light emitting elements 2 in the backlight substrate 10 is used for the display panel to realize the display function. The plurality of second light emitting elements 13 and the plurality of depth sensors 14 in the backlight substrate 10 may constitute a TOF gesture recognition device. The second light emitted from the plurality of second light emitting elements 13 of the backlight substrate 10 passes through the display panel, is reflected by an object (e.g., a hand of a user), and then enters the plurality of depth sensors 14 after passing through the display panel. In the plurality of depth sensors, calculation is made by using a depth algorithm to obtain depth information of the object, thereby realizing spatial positioning of the object. The display device having the backlight substrate according to the embodiments of the present disclosure can implement gesture recognition, and thus can implement both display function and human-computer interaction function.

In the backlight substrate according to the embodiment of the present disclosure, film materials for uniformizing display light in the conventional backlight substrate are omitted, and only a diffusion adhesive layer is adopted to diffuse display light (first light). Therefore, the imaging of the depth sensor in the backlight substrate according to the embodiments of the present disclosure is not affected by the film materials, so that the detection precision is greatly improved.

In some embodiments, the backlight substrate further includes a shielding structure 140 and an optical filter 141 and a lens 142 sequentially on a light receiving side of the depth sensor 14. As shown in FIG. 1, the depth sensor 14, the optical filter 141 and the lens 142 are located in a space defined by the shielding structure 140. The optical filter 141 is configured to filter out light other than the second light. The shielding structure 140 includes a bottom located on a non-light receiving side of the depth sensor 14 and a sidewall surrounding the depth sensor 14, the optical filter 141, and the lens 142. In some embodiments, as shown in FIG. 1, a distance H1 between a surface of the diffusion adhesive layer 15 away from the base substrate 11 and the base substrate 11 is greater than a height H2 of a light emitting surface S of the first light emitting element 12 relative to the base substrate 11, and is smaller than a height H3 of the shielding structure 140. The height H3 of the shielding structure 140 is greater than the thickness H1 of the diffusion adhesive layer 15, so that the diffusion adhesive layer 15 does not shield the lens 142, thereby avoiding the influence on the imaging of the depth sensor.

In some embodiments, the base substrate 11 is a printed circuit board (PCB) or a glass substrate. In some embodiments, the diffusion adhesive layer includes an LED sealant doped with an organic (epoxy) light diffuser.

Figure 8:
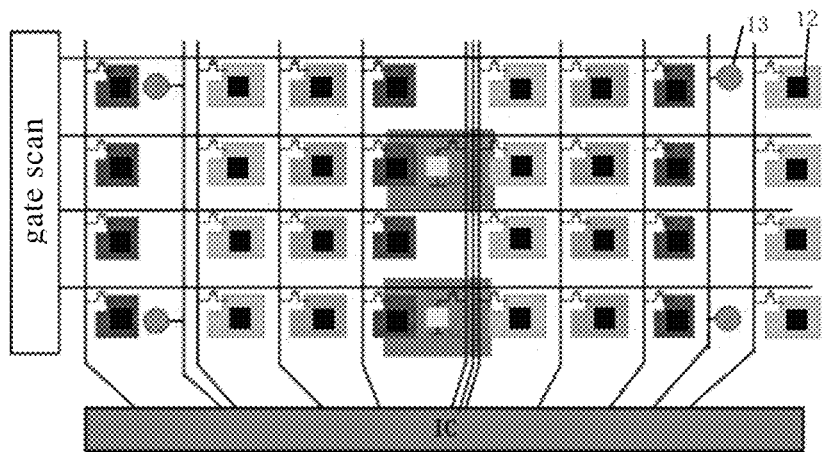
FIG. 8 is a schematic diagram illustrating a layout of first light emitting elements and second light emitting elements according to some embodiments of the present disclosure.

In some embodiments, the plurality of first light emitting elements 12 are novel light sources such as mini LEDs or micro LEDs. The TOF gesture recognition device including the plurality of second light emitting elements 13 and the plurality of depth sensors 14 may be provided in an existing backlight substrate including novel light sources such as mini LEDs or micro LEDs. In some embodiments, the plurality of first light emitting elements 12 are arranged in an array on the base substrate 11, and the plurality of second light emitting elements 13 and the plurality of depth sensors 14 are arranged at gaps between the plurality of first light emitting elements 12. As shown in FIG. 8, the plurality of first light emitting elements 12 are arranged in an array, and the plurality of second light emitting elements 13 are arranged at gaps between the plurality of second light emitting elements 12.

Figure 2:
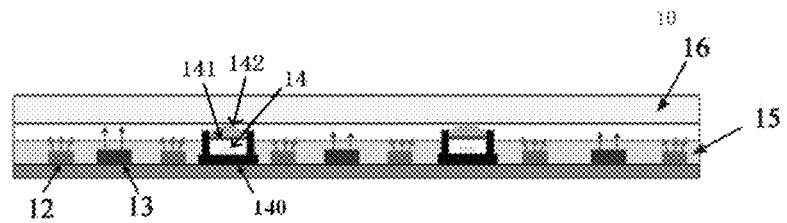
FIG. 2 is a schematic diagram illustrating a structure of a backlight substrate according to some embodiments of the present disclosure.

In some embodiments, as shown in FIG. 2, the backlight substrate 10 further includes a PET (polyethylene terephthalate) layer 16 located on a side of the diffusion adhesive layer 15 away from the base substrate 11. The diffusion and uniformization of the first light for display can be further enhanced by the PET layer 16.

Figure 3:
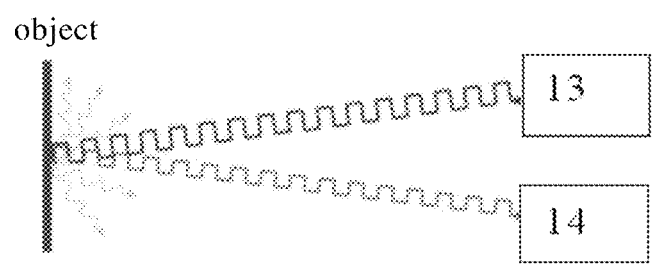
FIG. 3 is a diagram illustrating the operation principle of a TOF gesture recognizer according to some embodiments of the present disclosure.

In some embodiments, the plurality of second light emitting elements 13 are configured to emit modulated infrared light as the second light, the plurality of first light emitting elements 12 are configured to emit visible light as the first light, and the plurality of depth sensors 14 include infrared sensitive depth sensors. For example, the plurality of depth sensors are silicon-based image sensors. In this embodiment, the operation principle of the TOF gesture recognition device constituted by the plurality of second light emitting elements 13 and the plurality of depth sensors 14 is as shown in FIG. 3. The second light emitting element 13 emits modulated infrared light, which is reflected by an object (e.g., a user's hand) and then incident to the depth sensor 14, and the depth sensor demodulates the received light signal and calculates a distance value of the object based on a depth algorithm. The principle of TOF depth calculation is essentially to calculate the round trip time of light for distance measurement. The plurality of depth sensors realize 3D imaging through the same principle, and a complete depth map of an object can be obtained by combining detection results of the plurality of depth sensors, thereby facilitating implementation of gesture recognition and space interaction.

In addition, an infrared light source is adopted as the second light emitting element 13, so that the display function of the display panel is not influenced, and no damage is caused to the human body.

Figure 4:
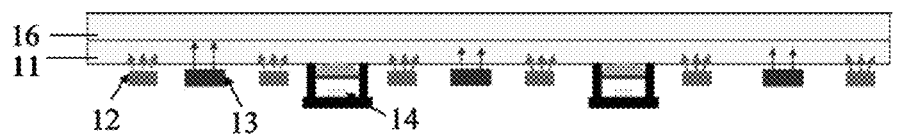
FIG. 4 is a schematic diagram illustrating a structure of a backlight substrate according to some embodiments of the present disclosure.

In some embodiments, as shown in FIG. 4, the base substrate 11 is a transparent substrate, e.g., a glass substrate; the plurality of first light emitting elements 12, the plurality of second light emitting elements 13, and the plurality of depth sensors 14 are located on a same side of the base substrate 11, and the base substrate 11 is located on the light emitting side of the plurality of first light emitting elements 12 and the plurality of second light emitting elements 13; the backlight substrate 10 further includes a PET layer 16 located on a side of the base substrate 11 away from the plurality of first light emitting elements 12, the plurality of second light emitting elements 13 and the plurality of depth sensors 14. By disposing the transparent base substrate on the light emitting side of the plurality of first light emitting elements 12, an optical path of the first light emitted from the first light emitting elements 12 is increased, thereby facilitating the diffusion of the first light.

Figure 7:
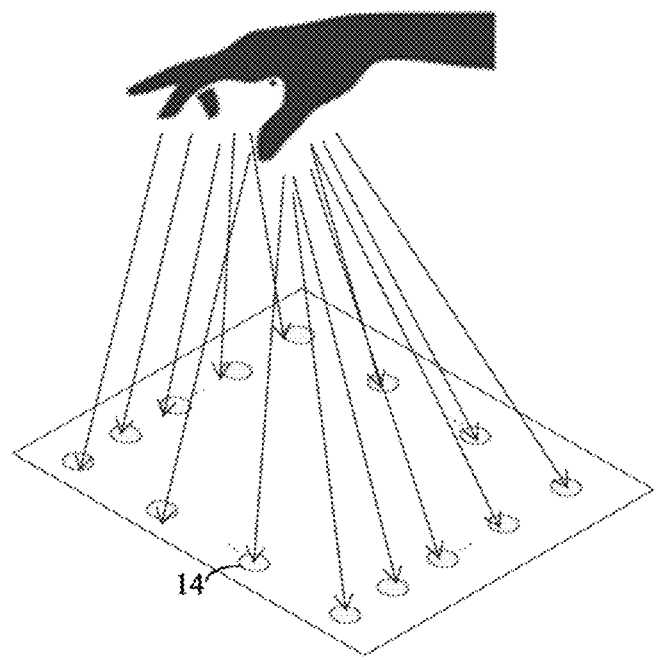
FIG. 7 is a schematic diagram illustrating a layout of depth sensors in some embodiments of the present disclosure.

It should be noted that, in the present disclosure, the arrangement of the plurality of first light emitting elements 12, the plurality of second light emitting elements 13, and the plurality of depth sensors 14 on the base substrate 11 is not limited. The plurality of depth sensors 14 may be disposed at a portion of the backlight substrate 10 corresponding to a display area of the display panel, or may be disposed at a portion of the backlight substrate 10 corresponding to a non-display area of the display panel (as shown in FIG. 7). In some embodiments, the plurality of depth sensors 14 are arranged along an edge of the base substrate 11.

Figure 5:
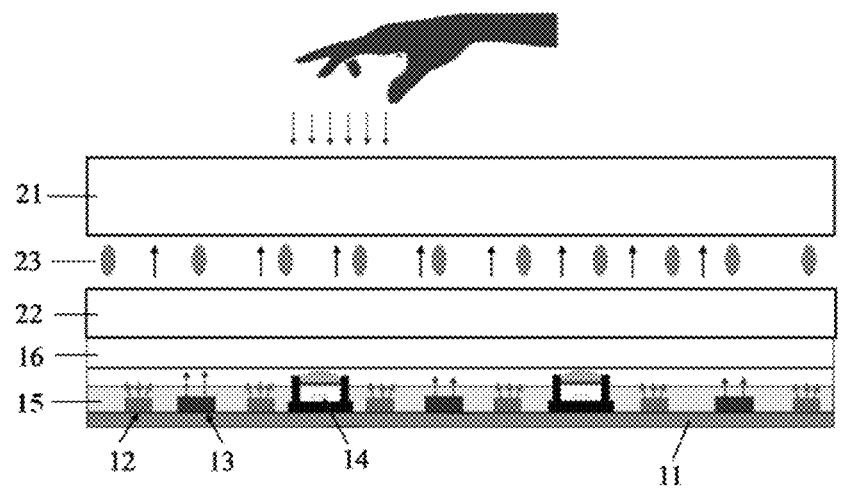
FIG. 5 is a schematic diagram illustrating a structure of a display device according to some embodiments of the present disclosure.

In another aspect, the present disclosure also provides a display device including a display panel and the backlight substrate according to the present disclosure. As shown in FIG. 5, the display device includes a display panel 20 and a backlight substrate 10. The display panel 20 is located on a light emitting surface of the backlight substrate 10.

Referring to FIG. 5, in some embodiments, the backlight substrate 10 includes a base substrate 11, and a plurality of first light emitting elements 12, a plurality of second light emitting elements 13, and a plurality of depth sensors 14 on the base substrate 11. The plurality of first light emitting elements 12 are configured to emit first light. The display panel 20 is configured to display an image using the first light emitted from the plurality of first light emitting elements 12 of the backlight substrate 10. The plurality of second light emitting elements 13 are configured to emit second light having a different wavelength from the first light. The plurality of depth sensors 14 are configured to receive the second light emitted from the plurality of second light emitting elements 13 and reflected by an object, and determine depth information of the object based on the received second light. In some embodiments, the plurality of first light emitting elements 12, the plurality of second light emitting elements 13, and the plurality of depth sensors 14 are located on a same side of the base substrate 11. In some embodiments, the backlight substrate 10 further includes a diffusion adhesive layer 15 located on a side of the plurality of first light emitting elements 12, the plurality of second light emitting elements 13, and the plurality of depth sensors 14 away from the base substrate 11 and in direct contact with light emitting surfaces S of the plurality of first light emitting elements 12. The diffusion adhesive layer 15 is configured to diffuse the first light emitted from the plurality of first light emitting elements 12. In some embodiments, the backlight substrate further includes a PET (polyethylene terephthalate) layer 16 located on a side of the diffusion adhesive layer 15 away from the base substrate 11. The diffusion and uniformization of the first light for display can be further enhanced by the PET layer 16.

In some embodiments, the backlight substrate further includes a shielding structure 140 and an optical filter 141 and a lens 142 in this order on a light receiving side of the depth sensor 14. The depth sensor 14, the optical filter 141 and the lens 142 are formed in a space defined by the shielding structure 140. The optical filter 141 is configured to filter out light other than the second light. In some embodiments, a distance H1 between a surface of the diffusion adhesive layer 15 away from the base substrate 11 and the base substrate 11 is greater than a distance H2 between the light emitting surface S of the first light emitting element 12 and the base substrate 11, and is smaller than a height H3 of the shielding structure 140.

In some embodiments, the display panel 20 is a liquid crystal display panel. The plurality of second light emitting elements 13 and the plurality of depth sensors 14 in the backlight substrate 10 may constitute a TOF gesture recognition device. In some embodiments, the plurality of first light emitting elements 12 are configured to emit visible light as the first light, and the display panel 20 displays an image using the visible light emitted from the plurality of first light emitting elements 12; the plurality of second light emitting elements 13 are configured to emit modulated infrared light as the second light, and the plurality of depth sensors 14 include infrared sensitive depth sensors. For example, the plurality of depth sensors are silicon-based image sensors.

For example, modulated infrared light emitted from the plurality of second light emitting elements 13 of the backlight substrate 10 passes through the display panel 20, is reflected by an object (e.g., a hand of a user), and then enters the plurality of depth sensors 14 after passing through the display panel 20. In the plurality of depth sensors, calculation is made by using a depth algorithm to obtain depth information of the object, thereby realizing the spatial positioning of the object. The display device according to the present disclosure can realize gesture recognition, and thus can realize both display function and human-computer interaction function.

As shown in FIG. 5, the display panel 20 may include a color filter substrate 21, an array substrate 22, and a liquid crystal layer 23 located between the color filter substrate 21 and the array substrate 22. It is understood that, in the present disclosure, there is no particular requirement on the infrared transmittance of the display panel. In some embodiments, the display panel 20 may have an infrared transmittance as high as possible. Under the condition that the infrared transmittance of the display panel is low, the luminous intensity of the infrared light source can be increased, so as to facilitate 3D detection.

Figure 6:
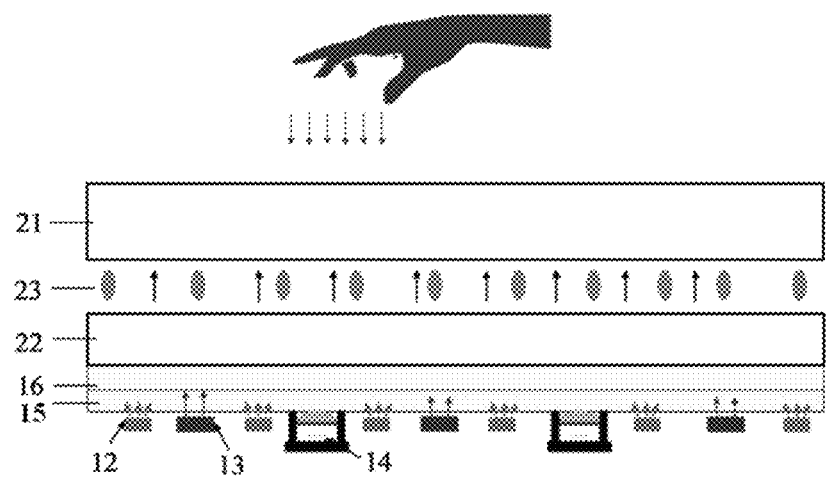
FIG. 6 is a schematic diagram illustrating a structure of a display device according to some embodiments of the present disclosure.

In some embodiments, as shown in FIG. 6, the base substrate 11 is a transparent substrate, e.g., a glass substrate; the plurality of first light emitting elements 12, the plurality of second light emitting elements 13, and the plurality of depth sensors 14 are located on a same side of the base substrate 11, and the base substrate 11 is located on the light emitting side of the plurality of first light emitting elements 12 and the plurality of second light emitting elements 13; the backlight substrate 10 further includes a PET layer 16 located on a side of the base plate 11 away from the plurality of first light emitting elements 12, the plurality of second light emitting elements 13 and the plurality of depth sensors 14. By disposing the transparent base substrate on the light emitting side of the plurality of first light emitting elements 12, the optical path of the first light emitted from the first light emitting elements 12 is increased, thereby facilitating the diffusion of the first light.

For other details of the backlight substrate 10, reference may be made to the above embodiments of the present disclosure, which will not be described herein again.

Figure 9:
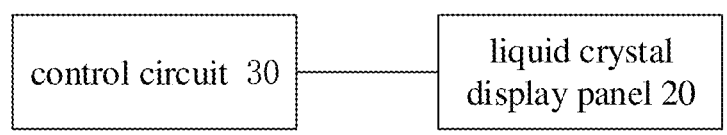
FIG. 9 is a schematic diagram illustrating the connection of a liquid crystal display panel and a control circuit according to some embodiments of the present disclosure.

In the case of providing the diffusion adhesive layer and the PET layer, unevenness in display brightness may still occur in the liquid crystal display panel due to insufficient diffusion and uniformization of display light. In this case, the deflection of the liquid crystals in the liquid crystal layer of the liquid crystal display panel can be adjusted to further make the display brightness uniform. In some embodiments, as shown in FIG. 9, the display device further includes a control circuit 30 configured to adjust the display uniformity by controlling the deflection of the liquid crystals in the liquid crystal display panel 20. For example, display uniformity may be measured based on the principle of a point spread function, and then adjusted by controlling the deflection of the liquid crystals using a weighted fitting method.

Figure 10:
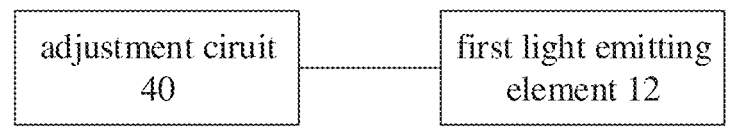
FIG. 10 is a schematic diagram illustrating the connection of an adjustment circuit and a first light emitting element according to some embodiments of the present disclosure.

In the case where the difference in brightness between the center and the edge of the light source (e.g., the first light emitting element) is large, adjusting the display uniformity directly based on a software algorithm may result in a large reduction in the number of display gray scales (brightness levels). For example, to uniformize the brightness of all pixels of the display panel, the pixel having the lowest brightness may be taken as the reference for uniformization, which may reduce the number of display gray scales (brightness levels). In this case, it is necessary to enhance the brightness of the display panel while ensuring the brightness uniformity. For example, the number of display gray scales may be increased by adjusting the brightness of light emitted from the first light emitting element (for example, a mini LED or a micro LED) in synchronization with image display, or the number of display gray scales may be expanded by increasing the conversion accuracy of an analog-to-digital converter (ADC) in the display device. In some embodiments, as shown in FIG. 10, the display device further includes an adjustment circuit 40 configured to adjust the brightness of light emitted from the first light emitting elements 12 to increase the number of display gray scales of the liquid crystal display panel while the liquid crystal display panel displays an image.

In another aspect, the present disclosure also provides a method of manufacturing a backlight substrate, including: providing a base substrate; forming a plurality of first light emitting elements, a plurality of second light emitting elements, and a plurality of depth sensors on the base substrate; and forming a diffusion adhesive layer in direct contact with light emitting surfaces of the plurality of first light emitting elements. The plurality of first light emitting elements are formed to emit first light. The plurality of second light emitting elements are formed to emit second light having a different wavelength from the first light. The plurality of depth sensors are formed to receive the second light emitted from the plurality of second light emitting elements and reflected by an object, and determine depth information of the object based on the received second light. The diffusion adhesive layer is configured to diffuse the first light emitted from the plurality of first light emitting elements.

In some embodiments, the plurality of first light emitting elements, the plurality of second light emitting elements, and the plurality of depth sensors are formed on a same side of the base substrate; forming a diffusion adhesive layer in direct contact with light emitting surfaces of the plurality of first light emitting elements includes forming the diffusion adhesive layer on a side of the plurality of first light emitting elements, the plurality of second light emitting elements, and the plurality of depth sensors away from the base substrate, the diffusion adhesive layer being formed to diffuse the first light emitted from the plurality of first light emitting elements.

In some embodiments, the method further includes forming a PET layer on a side of the diffusion adhesive layer away from the base substrate.

In some embodiments, the plurality of second light emitting elements are formed to emit modulated infrared light as the second light, the plurality of first light emitting elements are formed to emit visible light as the first light, and the plurality of depth sensors include infrared sensitive depth sensors.

In some embodiments, the plurality of first light emitting elements, the plurality of second light emitting elements, and the plurality of depth sensors are formed on a same side of the base substrate; the base substrate is a transparent substrate; the method also includes forming a PET layer on a side of the base substrate away from the plurality of first light emitting elements, the plurality of second light emitting elements, and the plurality of depth sensors.

In some embodiments, the plurality of first light emitting elements, the plurality of second light emitting elements, and the plurality of depth sensors are formed on the base substrate using micro-transfer techniques. The plurality of second light emitting elements and the plurality of depth sensors may be arranged at gaps between the plurality of first light emitting elements. Therefore, it is unnecessary to add an additional transfer substrate for the plurality of second light emitting elements and the plurality of depth sensors.

For example, each of the plurality of first light emitting elements is one of a mini LED and a micro LED.

In the method of manufacturing the backlight substrate according to the embodiments of the present disclosure, the step of forming film materials for uniformizing the display light in the conventional backlight substrate is omitted, and only the diffusion adhesive layer and/or the PET layer is formed to diffuse the display light (first light). Therefore, the imaging of the depth sensor in the backlight substrate manufactured by the manufacturing method of the embodiments of the present disclosure is not affected by the film materials, so that the detection precision is greatly improved.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. A backlight substrate, comprising:
a base substrate;
a plurality of first light emitting elements on the base substrate and configured to emit first light;
a plurality of second light emitting elements on the base substrate and configured to emit second light having a different wavelength from the first light;
a shielding structure on the base substrate;
a plurality of depth sensors in a space defined by the shielding structure and configured to receive the second light emitted from the plurality of second light emitting elements and reflected by an object and determine depth information of the object based on the received second light; and
a diffusion layer in direct contact with light emitting surfaces of the plurality of first light emitting elements and configured to diffuse the first light emitted from the plurality of first light emitting elements,
wherein a distance between a surface of the diffusion layer away from the base substrate and the base substrate is greater than a distance between a light emitting surface of the first light emitting element and the base substrate, and is smaller than a height of the shielding structure relative to the base substrate.

2. The backlight substrate of claim 1, further comprising: an optical filter and a lens which are sequentially on a light receiving side of the depth sensor,
wherein the optical filter and the lens are in the space defined by the shielding structure.

3. The backlight substrate of claim 1, wherein the diffusion layer comprises a sealant doped with an organic light diffuser.

4. The backlight substrate of claim 1, wherein the plurality of first light emitting elements, the plurality of second light emitting elements, and the plurality of depth sensors are on a same side of the base substrate, and
the diffusion layer is on a side of the plurality of first light emitting elements, the plurality of second light emitting elements, and the plurality of depth sensors away from the base substrate.

5. The backlight substrate of claim 4, further comprising a polyethylene terephthalate (PET) layer on a side of the diffusion layer away from the base substrate.

6. The backlight substrate of claim 1, wherein the plurality of second light emitting elements are configured to emit modulated infrared light as the second light, the plurality of first light emitting elements are configured to emit visible light as the first light, and the plurality of depth sensors comprises infrared sensitive depth sensors.

7. The backlight substrate of claim 1, wherein the plurality of first light emitting elements are arranged in an array on the base substrate, and the plurality of second light emitting elements are at gaps between the plurality of first light emitting elements.

8. The backlight substrate of claim 1, wherein the plurality of depth sensors are arranged along an edge of the base substrate.

9. A display device, comprising a display panel and the backlight substrate of claim 1, wherein the display panel is on a light emitting surface of the backlight substrate and configured to display an image using the first light emitted from the plurality of first light emitting elements of the backlight substrate.

10. The display device of claim 9, wherein the display panel is a liquid crystal display panel, and
the display device further comprises a control circuit configured to control deflection of liquid crystals in the liquid crystal display panel based on measured display uniformity of the liquid crystal display panel such that display brightness of the liquid crystal display panel is uniform.

11. The display device of claim 10, further comprising an adjustment circuit configured to adjust a number of display gray scales of the liquid crystal display panel by adjusting brightness of the first light emitted from the first light emitting elements while the liquid crystal display panel displays an image.

12. A method of manufacturing a backlight substrate, comprising:
providing a base substrate;
forming a plurality of first light emitting elements, a plurality of second light emitting elements, a shielding structure and a plurality of depth sensors on the base substrate, wherein the plurality of first light emitting elements are formed to emit first light; the plurality of second light emitting elements are formed to emit second light having a different wavelength from the first light; the plurality of depth sensors are formed in a space defined by the shielding structure to receive the second light emitted from the plurality of second light emitting elements and reflected by an object, and determine depth information of the object based on the received second light; and
forming a diffusion layer in direct contact with light emitting surfaces of the plurality of first light emitting elements, wherein the diffusion layer is configured to diffuse the first light emitted from the plurality of first light emitting elements,
wherein a distance between a surface of the diffusion layer away from the base substrate and the base substrate is greater than a distance between a light emitting surface of the first light emitting element and the base substrate, and is smaller than a height of the shielding structure relative to the base substrate.

13. The method of claim 12, further comprising forming an optical filter and a lens which are sequentially on a light receiving side of the depth sensor,
wherein the optical filter and the lens are formed in the space defined by the shielding structure.

14. The method of claim 12, wherein the diffusion layer comprises a sealant doped with an organic light diffuser.

15. The method of claim 12, wherein the plurality of first light emitting elements, the plurality of second light emitting elements, and the plurality of depth sensors are formed on a same side of the base substrate, and
the diffusion layer is formed on a side of the plurality of first light emitting elements, the plurality of second light emitting elements, and the plurality of depth sensors away from the base substrate.

16. The method of claim 12, further comprising forming a polyethylene terephthalate (PET) layer on a side of the diffusion layer away from the base substrate.

17. The method of claim 12, wherein the plurality of second light emitting elements are formed to emit modulated infrared light as the second light, the plurality of first light emitting elements are formed to emit visible light as the first light, and the plurality of depth sensors comprise infrared sensitive depth sensors.

18. The method of claim 12, wherein the plurality of first light emitting elements, the plurality of second light emitting elements, and the plurality of depth sensors are formed on the base substrate using micro-transfer technique.

* * * * *